(12) United States Patent
Suzuki et al.

(10) Patent No.: US 7,496,562 B2
(45) Date of Patent: Feb. 24, 2009

(54) MUSIC DATA SELECTION APPARATUS, MUSIC DATA SELECTION METHOD, AND INFORMATION RECORDING MEDIUM ON WHICH MUSIC DATA SELECTION PROGRAM IS COMPUTER-READABLY RECORDED

(75) Inventors: Yasunori Suzuki, Tsurugashima (JP); Yasuteru Kodama, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 849 days.

(21) Appl. No.: 10/823,598

(22) Filed: Apr. 14, 2004

(65) Prior Publication Data
US 2004/0206228 A1    Oct. 21, 2004

(30) Foreign Application Priority Data
Apr. 21, 2003   (JP)   ............................ 2003-115880

(51) Int. Cl.
G06F 17/30   (2006.01)
G06F 7/00    (2006.01)
(52) U.S. Cl. .................................. 707/3; 707/4; 707/10
(58) Field of Classification Search .................... 707/3, 707/10
See application file for complete search history.

(56) References Cited

U.S. PATENT DOCUMENTS 6,002,390 A * 12/1999 Masui ......................... 345/173
6,081,780 A * 6/2000 Lumelsky ................... 704/260

FOREIGN PATENT DOCUMENTS

| EP | 1 043 665 | 10/2000 |
|----|-----------|---------|
| JP | 01217783 | 8/1989 |
| JP | 08180061 | 7/1996 |
| JP | 2001-282847 | 10/2001 |
| JP | 2002 099574 | 4/2002 |
| JP | 2003 016085 | 1/2003 |

OTHER PUBLICATIONS

Wang et al. Content-based UEP: a new scheme for packet loss recovery in music streaming, International Multimedia of the eleven ACM international conference on Multimeida, 2003, pp. 412-421.*
Bell et al. A call for home media network, Communication of the ACM, vol. 45, Issue, 7, Jul. 2002, pp. 71-75.*

* cited by examiner

Primary Examiner—Baoquoc N To
(74) Attorney, Agent, or Firm—Young & Thompson (57) ABSTRACT

An on-vehicle electronics device comprises a data determination portion which determines music data matching with a keyword and generates a reproduction list to be used on performing keyword reproduction, where the data determination portion detects the music data matching with the keyword set up by a user from the music data stored in a data storage portion or the music data stored on the optical disk based on analytical data and generates the reproduction list of the music data matching therewith so as to reproduce the music data based on the reproduction list.

14 Claims, 5 Drawing Sheets

| ANALYZED MUSIC DATA | THESAURUS GROUP | | |
|---|---|---|---|
| | IMAGE WORD a | IMAGE WORD b | IMAGE WORD c |
| MUSIC DATA1 | a (1) | b (1) | c (1) |
| MUSIC DATA2 | a (2) | b (2) | c (2) |
| MUSIC DATA3 | a (3) | b (3) | c (3) |
| MUSIC DATA4 | a (4) | b (4) | c (4) |
| MUSIC DATA5 | a (5) | b (5) | c (5) |
| MUSIC DATA6 | a (6) | b (6) | c (6) |
| MUSIC DATA7 | a (7) | b (7) | c (7) |
| MUSIC DATA8 | a (8) | b (8) | c (8) |
| ... | ... | ... | ... |
| MUSIC DATAm | a (m) | b (m) | c (m) |

FIG. 4

| MATCHING MUSIC DATA | THESAURUS GROUP | | |
|---|---|---|---|
| | IMAGE WORDa | IMAGE WORDb | IMAGE WORDc |
| MUSIC DATA1 | A (1) | B (1) | C (1) |
| MUSIC DATA2 | A (2) | B (2) | C (2) |
| MUSIC DATA3 | A (3) | B (3) | C (3) |
| MUSIC DATA4 | A (4) | B (4) | C (4) |
| MUSIC DATA5 | A (5) | B (5) | C (5) |
| MUSIC DATA6 | A (6) | B (6) | C (6) |
| MUSIC DATA7 | A (7) | B (7) | C (7) |
| MUSIC DATA8 | A (8) | B (8) | C (8) |
| MUSIC DATA9 | A (9) | B (9) | C (9) |
| MUSIC DATA10 | A (10) | B (10) | C (10) |

FIG. 5

MUSIC DATA SELECTION APPARATUS, MUSIC DATA SELECTION METHOD, AND INFORMATION RECORDING MEDIUM ON WHICH MUSIC DATA SELECTION PROGRAM IS COMPUTER-READABLY RECORDED

BACKGROUND OF THE INVENTION

1. Field of the Invention

The present invention belongs to a technical field of a music reproducing apparatus which reproduces music.

2. Related Art

As a general trend in recent years, a music reproducing apparatus comprises a drive to reproduce a hard disk having music information stored thereon in advance or an optical disk such as a CD-ROM (Compact Disc Read Only Memory) or a DVD (Digital Versatile Disc) having music information stored thereon in advance so as to reproduce the music information.

Such a music reproducing apparatus automatically selects and reproduces music. In particular, the music reproducing apparatus mounted on a vehicle (hereafter, referred to as an on-vehicle music reproducing apparatus) rarely has music data selected and reproduced one by one, and so it selects and reproduces a plurality of pieces of music data in stored order or at random.

Recently, regarding such a music reproducing apparatus, a research is going on as to a technology to automatically make a selection based on sensitivity of an individual user while considering a driving environment of the vehicle in addition to the above-mentioned selection and reproduction.

As for such a music reproducing apparatus in the past which selects optimum music data, the music data is selected based on experimental data and questionnaire information obtained in advance. To be more precise, the stored music data is classified into predetermined types based on the experimental data and questionnaire information so as to reproduce classified music information based on the driving environment and a mood of the user. Refer to Patent Document, for instance, Japanese Patent Laid-Open No. 2001-282847.

As for the above-mentioned music reproducing apparatus, however, music data is classified into types based on experimental data and questionnaire information, and so it is not possible to correctly grasp sensitivity which is different from one user to another. Thus, it is difficult to select the music data which accurately matches with the sensitivity of the user.

SUMMARY OF THE INVENTION

The present invention has been implemented in consideration of the problems, and an example of an issue thereof is to provide the music reproducing apparatus capable of selecting optimum music information for each individual.

The above object of the present invention can be achieved by a music data selection apparatus provided with: at least one of a storage device which has a plurality of pieces of music data stored thereon and a reading device which reads the music data from a storage medium which has a plurality of pieces of music data recorded thereon; a setting device which sets a search key as a standard of selection of the music data to be reproduced in the case of selecting the music data to be reproduced from the stored plurality of pieces of music data; a detection device which detects at least an appearance frequency of an image word included in the music data by each piece of the stored music data; an appearance frequency calculation device which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and a selection device which selects the music data matching with the set search key from the stored music data based on the set search key and the calculated appearance frequency of the image word in the music data.

The above object of the present invention can be achieved by a music data selection apparatus provided with: at least one of a storage device which has a plurality of pieces of music data stored thereon and a reading device which reads the music data from a storage medium which has a plurality of pieces of music data stored thereon; a setting device which sets a search key as a standard of selection of the music data to be reproduced in the case of selecting the music data to be reproduced from the stored plurality of pieces of music data; a detection device which detects at least an appearance frequency of an image word included in the music data by each piece of the stored music data; a determination information obtaining device which obtains determination information indicating whether or not the stored music data matches with the set search key; an appearance frequency calculation device which calculates a correlation value between the set search key and the detected image word based on the obtained determination information and the detected image word of the music data, and calculates the appearance frequency of the image word included in the music data in the set search key based on the calculated correlation value; and a selection device which selects the music data matching with the set search key from the stored music data based on the set search key and the calculated appearance frequency of the image word in the music data.

The above object of the present invention can be achieved by a music data selection method provided with: a reading process which reads music data from one of a storage device which has a plurality of pieces of music data stored thereon and a storage medium which has a plurality of pieces of music data recorded thereon; a setting process which sets a search key as a standard of selection of the music data to be reproduced in the case of selecting the music data to be reproduced from the stored plurality of pieces of music data; a detection process which detects at least an appearance frequency of an image word included in the music data by each piece of the stored music data; an appearance frequency calculation process which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and a selection process which selects the music data matching with the set search key from the stored music data based on the set search key and the calculated appearance frequency of the image word in the music data.

The above object of the present invention can be achieved by a music data selection method provided with: a reading process which reads the music data from one of a storage device which has a plurality of pieces of music data stored thereon and a storage medium which has a plurality of pieces of music data stored thereon; a setting process which sets a search key as a standard of selection of the music data to be reproduced in the case of selecting the music data to be reproduced from the stored plurality of pieces of music data;

a detection process which detects at least an appearance frequency of an image word included in the music data by each piece of the stored music data; a determination information obtaining process which obtains determination information indicating whether or not the stored music data matches with the set search key; an appearance frequency calculation process which calculates a correlation value between the set search key and the detected image word based on the obtained determination information and the detected image word of the music data, and calculates the appearance frequency of the image word included in the music data in the set search key based on the calculated correlation value; and a selection process which selects the music data matching with the set search key from the stored music data based on the set search key and the calculated appearance frequency of the image word in the music data.

The above object of the present invention can be achieved by an information recording medium on which a music data selection program is computer-readably recorded, provided with the music data selection program causes a computer to function as: a reading device which reads music data from one of a storage device which has a plurality of pieces of music data stored thereon and a storage medium which has a plurality of pieces of music data stored thereon; a setting device which sets a search key as a standard of selection of the music data to be reproduced in the case of selecting the music data to be reproduced from the stored plurality of pieces of music data; a detection device which detects at least an appearance frequency of an image word included in the music data by each piece of the stored music data; an appearance frequency calculation device which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and a selection device which selects the music data matching with the set search key from the stored music data based on the set search key and the calculated appearance frequency of the image word in the music data.

The above object of the present invention can be achieved by an information recording medium on which a music data selection program is computer-readably recorded, provided with the music data selection program causes a computer to function as: a reading device which reads music data from one of a storage device which has a plurality of pieces of music data stored thereon and a storage medium which has a plurality of pieces of music data stored thereon; a setting device which sets a search key as a standard of selection of the music data to be reproduced in the case of selecting the music data to be reproduced from the stored plurality of pieces of music data; a detection device which detects at least an appearance frequency of an image word included in the music data by each piece of the stored music data; a determination information obtaining device which obtains determination information indicating whether or not the stored music data matches with the set search key; an appearance frequency calculation device which calculates a correlation value between the set search key and the detected image word based on the obtained determination information and the detected image word of the music data, and calculates the appearance frequency of the image word included in the music data in the set search key based on the calculated correlation value; and a selection device which selects the music data matching with the set search key from the stored music data based on the set search key and the calculated appearance frequency of the image word in the music data.

DESCRIPTION OF THE PREFERRED EMBODIMENTS

Next, preferred embodiments of the present invention will be described based on the drawings.

This is an embodiment in the case of applying it to an on-vehicle electronics device which is mounted on a mobile object such as a vehicle and reproduces music data stored on an optical disk player or a hard disc.

First, a description will be given by using FIG. 1 as to an overall configuration and an overview operation of the on-vehicle electronics device according to this embodiment.

Figure 1:
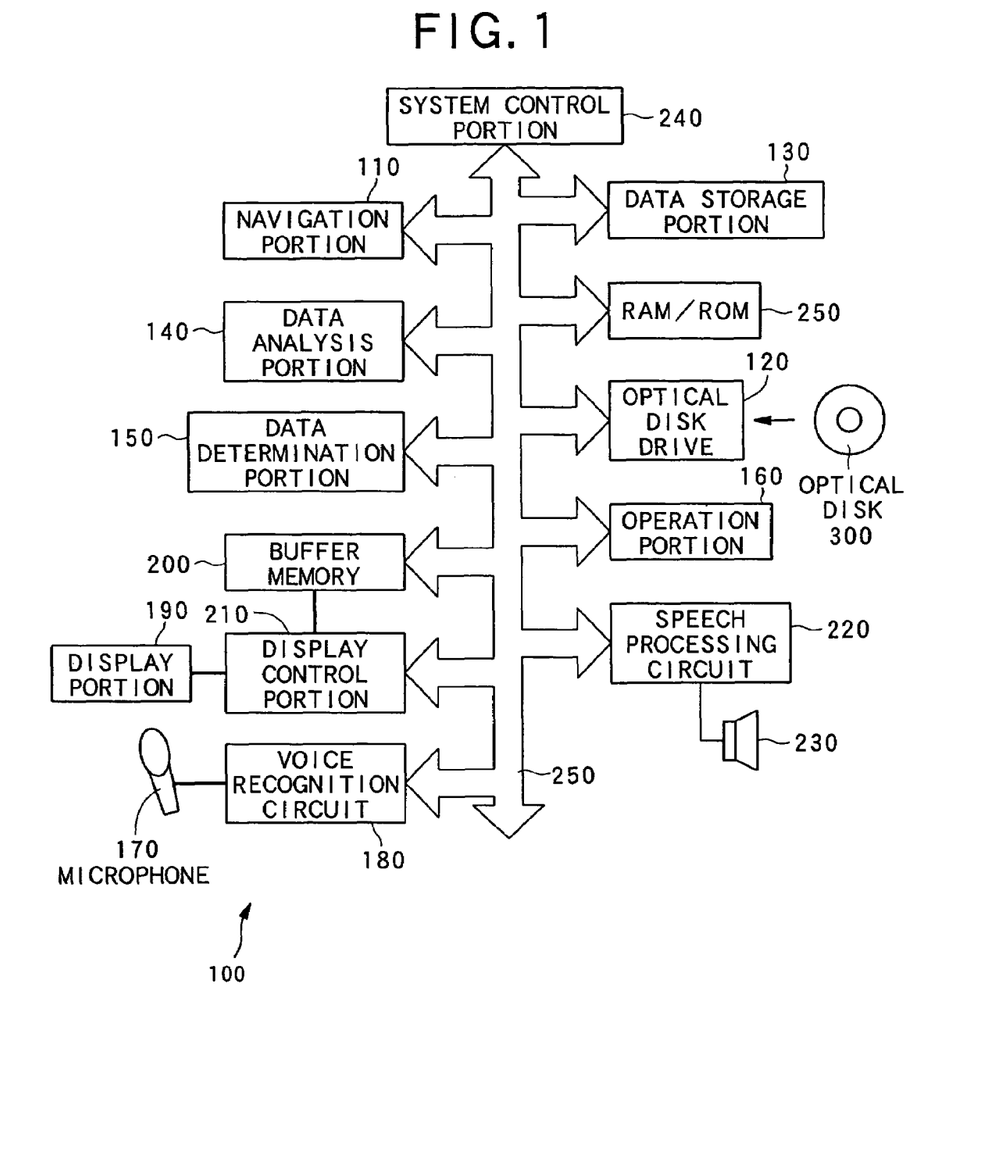
FIG. 1 is a block diagram showing an overview configuration of an on-vehicle electronics device according to the present invention.

FIG. 1 is a block diagram showing an overview configuration of the on-vehicle electronics device according to the present invention.

As shown in FIG. 1, an on-vehicle electronics device 100 according to this embodiment is comprised of a navigation portion 110 which performs navigation of a vehicle having the on-vehicle electronics device 100 mounted thereon, an optical disk drive 120 which reads various kinds of data from an optical disk 300 having data such as map data and music data stored thereon, a data storage portion 130 which stores various kinds of data such as the map data and the music data, a data analysis portion 140 which performs a data analysis of the music data and generates a list of image words in the music data, a data determination portion 150 which determines the music data matching with a keyword as a search key and generates a reproduction list to be used on performing keyword reproduction, an operation portion 160 which has each setting made by a user, a microphone 170 which collects voice of the user, a voice recognition circuit 180 which recognizes an instruction provided to a system from the voice collected by the microphone 170, a display portion 190 which displays the map data and so on and also displays a setting status and an operation status of the on-vehicle electronics device 100, a display control portion 210 which controls the display portion 190 by using a buffer memory 200, a speech processing circuit 220 which reproduces the music data, a speaker 230 which amplifies the music data processed by the speech processing circuit 220, a system control portion 240 which controls the entire system, and ROM/RAM 250, where the system control portion 240 is connected to each individual portion by a bus 260.

For instance, the optical disk drive 120 according to this embodiment constitutes a reading device of the present invention, and the data storage portion 130 according to this embodiment constitutes a storage device of the present invention.

And for instance, the data analysis portion 140 according to this embodiment constitutes a detection device and an appearance frequency calculation device of the present invention, and the data determination portion 150 according to this embodiment constitutes the appearance frequency calculation device and a selection device of the present invention.

Furthermore, the operation portion 160, voice recognition circuit 180 and system control portion 240 constitute a setting device of the present invention, for instance.

The navigation portion 110 detects various kinds of data for the sake of performing a route guidance such as obtaining a current position, a traveling speed and a traveling direction of a vehicle on which the on-vehicle electronics device 100 is mounted, and controls each portion relating to the route guidance based on various kinds of detected data.

For instance, the navigation portion 110 is comprised of a GPS receiving portion which receives GPS (Global Positioning System) data, a sensor portion which detects traveling data such as the traveling speed of the vehicle, a route guidance management portion which manages the route guidance and so on, where the route guidance management portion controls each individual portion via the system control portion 240.

The optical disk drive 120 has a housing portion which removably houses the optical disk 300 such as a DVD or a CD and a reading drive which reproduces each optical disk 300. The optical disk drive 120 reads the map data such as a road map and other necessary information for a traveling guidance (hereafter, referred to as the map data and so on) stored on each optical disk 300 in advance.

And the optical disk drive 120 can also reproduce the optical disk 300 such as a DVD or a CD storing content data such as audio and video and other data (hereafter, referred to as the content data and so on). In particular, the optical disk drive 120 according to this embodiment reproduces the optical disk 300 storing the music data, and outputs the reproduced music data to the speech processing circuit 220 or the display control portion 210 via the system control portion 240.

The data storage portion 130 is comprised of a hard disk for instance, and reads the map data and so on stored in advance and also outputs the read map data and so on to the system control portion 240, as the optical disk drive 120 does.

The data storage portion 130 also has the stored content data reproduced. In particular, the stored music data is reproduced, and the reproduced music data is outputted to the speech processing circuit 220 or the display control portion 210 via the system control portion 240 according to this embodiment.

As for the music data stored in the data storage portion 130 or the music data stored in the optical disk 300, the data analysis portion 140 performs a data analysis of lyrics data included in the music data in order to reproduce the stored music data based on the keyword set up by the user (hereafter, referred to as keyword reproduction). And it stores analysis results in the ROM/RAM 250.

The keyword reproduction means to have an atmosphere of the music data desired to be heard on the reproduction thereof identified by the user with the keyword and have the stored music data selected and reproduced by a music reproducing apparatus based on the keyword. For instance, this embodiment allows the keyword representing a sense of the user to be set up, such as a "heart warming tune," a "refreshing tune," a "danceable tune" or a "calming tune." This keyword is set up via the operation portion 160 or the voice recognition circuit 180.

It is also possible to add the keyword as the search key afterward via the operation portion 160 or the voice recognition circuit 180.

It is also possible to reproduce the music data like the keyword voice by using image data such as a digital camera photo as the search key.

For instance, in the case of using the image data as the search key, this navigation apparatus has an input portion to input the image data or a communication portion to receive the image data provided therein so as to perform the reproduction based on an image inputted via the input portion or the communication portion.

To be more precise, the data analysis portion 140 performs a thesaurus analysis of the lyrics data included in each piece of the music data, and stores the results of the thesaurus analysis as analytical data in the ROM/RAM 250 via the system control portion 240.

The configuration and operation of the data analysis portion 140 according to this embodiment will be described later.

On performing the keyword reproduction, the data determination portion 150 detects the music data matching with the keyword set up by the user from the music data stored in the data storage portion 130 or the music data stored on the optical disk 300 based on the analytical data stored in the ROM/RAM 250, and outputs a list of the matching music data (hereafter, referred to as a reproduction list) to the system control portion 240.

To be more precise, the data determination portion 150 has a fixed number of pieces of music data determined by the user based on the keyword to be set upon the keyword reproduction, calculates a correlation value between each image word and the keyword to be set up in the determined music data, and also calculates a score of the music data belonging to a selection range of the set-up keyword based on the calculated correlation value. It generates the reproduction list of the music data belonging to the selection range desired to be reproduced based on the calculated score of the music data so as to output the generated reproduction list to the system control portion 240.

The selection range to which the music data belongs refers to the selection range of the music data which, on performing the keyword reproduction with the operation portion 160 mentioned later, the user desires to reproduce from the music data stored in the optical disk 300 or the data storage portion 130. It is the selection range of the music data which the user sets up via the operation portion 160 and desires to reproduce, such as only the music data stored in the data storage portion 130 or only the music data stored in the optical disk 300 for instance.

Details of the configuration and operation of the data determination portion 150 according to this embodiment will be described later.

The operation portion 160 is comprised of a remote control apparatus including various confirmation buttons and a large number of keys such as numeric keys, and is used to input instructions of an operator such as a navigation setting and the instruction to stop the reproduction of music information.

In particular, on performing the keyword reproduction, the operation portion 160 can set up the above-mentioned selection range of the music data and also set up the keyword.

The voice recognition circuit 180 has a speech voice generated by the user and inputted to the microphone 170 inputted thereto. And for instance, the voice recognition circuit 180 analyzes the speech voice inputted as an operation command for music data reproduction and outputs the analysis results to the system control portion 240.

The display portion 190 is comprised of a CRT or a liquid crystal display element, which displays the map data and so on in various forms according to control of the display control portion 210 and also displays various statuses necessary for the route guidance such as a current location of the vehicle by superimposing them thereon.

The display portion 190 also displays content information other than the map data. And in particular, it displays a preset screen on reproducing the music data and displays a predetermined screen via the display control portion 210 based on the instruction of the system control portion 240.

The display control portion 210 has the map data and so on or predetermined screen data inputted via the system control portion 240 inputted thereto. The display control portion 210 generates display data to be displayed on the above-mentioned display portion 190 based on the instruction of the system control portion 240, and reads the display data from the buffer memory 200 in predetermined timing while temporarily storing it therein so as to output it to the display portion 190 for display.

The speech processing circuit 220 generates an audio signal from the music data or predetermined data based on the instruction of the system control portion 240, and amplifies the generated audio signal via the speaker 230.

The system control portion 240 includes various input-output ports such as a GPS receiving port, a key input port and a display control port so as to control overall functions of the on-vehicle electronics device 100.

To be more precise, the system control portion 240 controls overall operations such as the route guidance and music data reproduction as well as display output and audio output thereof. It perform search process by reading a control program stored in the ROM/RAM 250, and exerts control for the route guidance by temporarily holding the data in process in the ROM/RAM 250.

In particular, in the case of performing the keyword reproduction based on the music data stored in the data storage portion 130 or the music data stored on the optical disk 300 accommodated in the optical disk drive 120, the system control portion 240 amplifies the music data selected by controlling the portions such as the data analysis portion 140 and the data determination portion 150, and outputs it to the outside via the speech processing circuit 220 and speaker 230. The operation of the keyword reproduction in this embodiment will be described later.

The ROM/RAM 250 has the analytical data of the analysis results and correlation value data of the image words used on the keyword reproduction stored therein. As for the analytical data, IDs by which the music data is stored and appearance frequencies of the image words thereof are stored. As for the correlation value data, calculated correlation value data of each image word is stored by each keyword as will be described later.

Next, a description will be given by using FIG. 2 as to the data analysis portion 140 which performs the data analysis of the music data and generates the list of the image words in the music data and the data determination portion 150 which determines the music data matching with the keyword and generates the reproduction list to be used on performing keyword reproduction.

Figure 2:
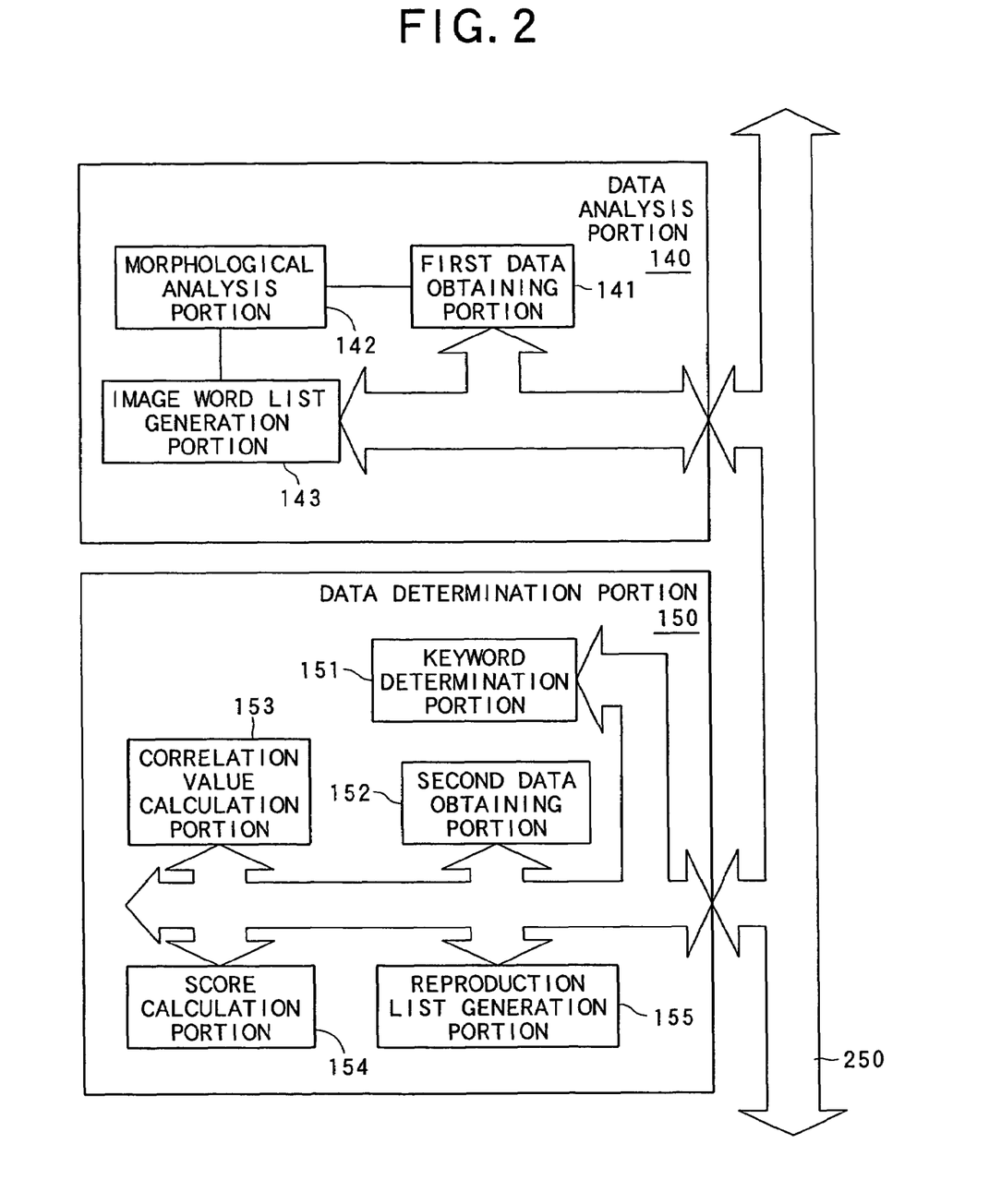
FIG. 2 is a block diagram showing configurations of a data analysis portion and a data determination portion of the on-vehicle electronics device according to the present invention.

FIG. 2 is a block diagram showing the configurations of the data analysis portion 140 and the data determination portion 150 in the on-vehicle electronics device 100 according to the present invention.

The data analysis portion 140 is comprised of a first data obtaining portion 141 which obtains the music data for the data analysis, a morphological analysis portion 142 which performs a morphological analysis of the music data based on the lyrics data included in the obtained music data, and an image word list generation portion 143 which generates the list of the image words of the music data analyzed by the morphological analysis portion 142. Each portion is controlled by the system control portion 240.

For instance, the morphological analysis portion 142 according to this embodiment constitutes a frequency calculation device of the present invention, and the image word list generation portion 143 according to this embodiment constitutes an overall appearance frequency calculation device, an information amount calculation device and the frequency calculation device of the present invention.

The first data obtaining portion 141 reads the music data for the data analysis by each piece of the music data from the data storage portion 130 storing the music data in advance or from the optical disk 300 accommodated in the optical disk drive 120 based on the instruction of the system control portion 240, and outputs the read music data to the morphological analysis portion 142.

To be more precise, when the instruction for the keyword reproduction is inputted to the system control portion 240 via the operation portion 160, the first data obtaining portion 141 reads the music data belonging to the selection range tune by tune from the data storage portion 130 or from the optical disk 300 based on the selection range of the music data set up by the operation portion 160 so as to output the read music data to the morphological analysis portion 142.

The morphological analysis portion 142 has the music data obtained by the first data obtaining portion 141 inputted thereto. The morphological analysis portion 142 performs the morphological analysis of the lyrics data included in the inputted music data, and renders the analyzed lyrics data as a characteristic amount so as to output the characteristic amount to the image word list generation portion 143.

To be more precise, the morphological analysis portion 142 extracts important words representing the contents of the lyrics such as "dream" and "eternity" (hereafter, referred to as the image words) included in the lyrics data and performs the thesaurus analysis thereof to detect the appearance frequencies of the image words in the music data. And it outputs the extracted image words and the appearance frequencies thereof as an image word list to the image word list generation portion 143.

There are ordinarily many image words in the lyrics data. Therefore, to simply analyze the appearance frequency of each image word included in the lyrics data, it is necessary to detect a majority of the image words and the appearance frequencies thereof so that the analysis results cannot be easily used. To be more specific, data processing to connect each image word to the keyword becomes more cumbersome as the number of detected image words increases so that the analysis results cannot be easily used. Thus, in the case of performing the morphological analysis, this embodiment performs the thesaurus analysis wherein the image words included in the lyrics data are detected and then the words related to each image word (hereafter, referred to as synonyms) are put together by using thesaurus dictionary data to include detected synonyms in the appearance frequency of one image word so that the analysis results can be easily used.

For instance, in the case of detecting the image word "yearning" included in the lyrics data according to the thesaurus analysis of this embodiment, the morphological analysis portion 142 also detects the image words such as "sigh,"

"ache" or "solitude" indicating the synonyms thereof as the image words of the "yearning." It includes the appearance frequencies of the detected synonyms in the appearance frequency of the image word "yearning" and outputs it to the image word list generation portion 143.

According to this embodiment, the morphological analysis portion 142 puts them together as a fixed number of image words, that is, an image word group (thesaurus group) in principle by performing the thesaurus analysis, and outputs the image word group put together and the appearance frequencies thereof to the image word list generation portion 143.

According to this embodiment, the thesaurus dictionary data indicating the image word group is stored in advance in an internal memory not shown, where the image words or the synonyms thereof can be set up via the operation portion 160.

The image word list generation portion 143 has the image word and the characteristic amount as a quantity thereof inputted thereto. The image word list generation portion 143 calculates the appearance frequency of the image word by each piece of the music data in the selection range based on the inputted image word and appearance frequency thereof and also performs a certain correction. And it generates the list of the image words and quantities thereof in each piece of the corrected music data (hereafter, simply referred to as the image word list) so as to store the corrected image word list in the ROM/RAM 250 via the system control portion 240.

To be more precise, the image word list generation portion 143 according to this embodiment calculates the appearance frequency of each image word by using a technique of entropy, and corrects the appearance frequency of each image word in the music data based on the calculated appearance frequency.

Details of a correction process of the appearance frequency of the image word using the entropy (hereafter, referred to as the correction process) according to this embodiment will be described later.

The data determination portion 150 comprises a keyword determination portion 151 which determines a predetermined number of pieces of music data based on the keyword to be set upon the keyword reproduction, a second data obtaining portion 152 which obtains the analytical data of the determined music data from the ROM/RAM 250, a correlation value calculation portion 153 which calculates the correlation value of each image word to the keyword set up based on the obtained analytical data, a score calculation portion 154 which calculates a score of the music data belonging to the selection range based on the correlation value calculated on the keyword reproduction, and a reproduction list generation portion 155 which generates the reproduction list of the music data matching with the keyword on performing the keyword reproduction based on the calculated score of the music data.

For instance, the keyword determination portion 151 according to this embodiment constitutes a determination information obtaining device of the present invention, and the correlation value calculation portion 153 according to this embodiment constitutes the overall appearance frequency calculation device, a standard deviation calculation device, a correlation value calculation device, the frequency calculation device and a normalization device of the present invention.

And for instance, the score calculation portion 154 and the reproduction list generation portion 155 according to this embodiment constitute the frequency calculation device and the selection device of the present invention.

The keyword determination portion 151 has the keyword on performing the keyword reproduction inputted thereto, and stores the inputted keyword inside it.

On performing the keyword reproduction, the keyword determination portion 151 has a determination made by the user as to whether or not a certain number of pieces of music data match with the keyword to be set up on the keyword reproduction. It outputs the determination results thereof and the keyword on the determination to the second data obtaining portion 152.

For instance, in the case where the keyword is "heart warming," the keyword determination portion 151 performs the determination until a certain number of the tunes matching or not matching with the keyword are determined. And it outputs the results thereof to the second data obtaining portion 152 in the case where either the tunes matching or not matching with the keyword reach a certain number.

According to this embodiment, the determination of the music data is basically performed until at least the number of either the tunes matching or not matching with each keyword becomes ten or more.

In the case where a certain number of either the tunes matching or not matching with each keyword are already determined, the latest music data equivalent to ten tunes is always outputted to the correlation value calculation portion 153 via the second data obtaining portion 152 each time the keyword determination is newly performed. In this case, either the music data matching or not matching with the keyword which is less than ten tunes is not outputted to the correlation value calculation portion 153.

Furthermore, according to this embodiment, as to the determination of whether matching or not matching with each keyword, it is possible to prompt the user to make the determination of the music data selected by the user after finishing the reproduction thereof on the music data reproduction other than the keyword reproduction. It is possible to control the operation portion 160, the voice recognition circuit 180, the display portion 190 and the speech processing circuit 220 via the system control portion 240 and have the determination made on or during the keyword reproduction.

Furthermore, the keyword determination portion 151 may determine a piece of music data entirely reproduced to be the music data matching with each keyword on the music data reproduction, and the keyword determination portion 151 may determine it to be the music data not matching with each keyword in the case where the music data reproduction is interrupted or stopped by a skip operation and so on.

The second data obtaining portion 152 obtains the data on the image word list in the music data determined by the keyword determination portion 151, that is, the music data included in the determination results from the ROM/RAM 250, and outputs the obtained data on the image word list in the music data to the correlation value calculation portion 153 and the score calculation portion 154.

The correlation value calculation portion 153 has the image word list in the music data inputted thereto. The correlation value calculation portion 153 normalizes the inputted image word list in the music data (hereafter, referred to as a normalization process), and calculates the correlation value of the keyword of each normalized image word list so as to output the calculated correlation value to the score calculation portion 154 or the ROM/RAM 250.

The correlation value calculation portion 153 also calculates the correlation value to the music data outputted via the second data obtaining portion 152 each time new music data is determined by the keyword determination portion 151. It always calculates the correlation value of each image word of the keyword based on the latest music data determined by the keyword determination portion 151, and outputs the calculated correlation value as the correlation value data to the score calculation portion 154 or the ROM/RAM 250.

According to this embodiment, the correlation value calculation portion 153 outputs or stores the correlation value data for each keyword and each image word.

Details of the normalization process based on the image word list and a calculation process of the correlation value of each image word of the keyword (hereafter, simply referred to as a correlation value calculation process) according to this embodiment will be described later.

The score calculation portion 154 has the correlation value data of each image word of the keyword to be set up on the reproduction of the keyword outputted from the ROM/RAM 250 or the correlation value calculation portion 153 and the data on the image word list in the music data obtained by the second data obtaining portion 152 inputted thereto.

The score calculation portion 154 calculates the score of the music data belonging to the selection range based on the inputted correlation value of each image word and the inputted image word list of the music data, and outputs the data on the calculated score of the music data of the keyword (hereafter, referred to as score data) to the reproduction list generation portion 155.

To be more precise, the score calculation portion 154 multiplies the appearance frequency of each image word in the music data by the correlation value of each image word of the keyword by each piece of the music data, and adds the image words multiplied by the correlation value so as to generate the score data. Details of the score data in the score calculation portion 154 will be described later.

The score calculation portion 154 calculates the score as to the music data belonging to the selection range selected by the operation portion 160, and outputs the calculated score data of the music data to the reproduction list generation portion 155.

The reproduction list generation portion 155 has the score data of the music data belonging to the selection range inputted thereto, and generates the reproduction list of the music data matching with the keyword set up based on the inputted score data so as to output the generated reproduction list to the system control portion 240.

To be more precise, the reproduction list generation portion 155 generates the reproduction list in order of the scores of the score data of the music data belonging to the selection range. It is also possible, however, to delete the music data of a predetermined score or less from the reproduction list as the music data not matching with the keyword.

Thus, according to this embodiment, the correlation value of each image word is calculated for each keyword, and the reproduction list of the music data matching with the keyword is generated based on the calculated correlation value of each image word so as to select the music data based on the reproduction list.

According to this embodiment, the system control portion 240 controls each portion based on the reproduction list and performs the keyword reproduction.

Next, the correction process of the image word list generation portion 143 according to this embodiment will be described by using FIG. 3.

Figure 3:
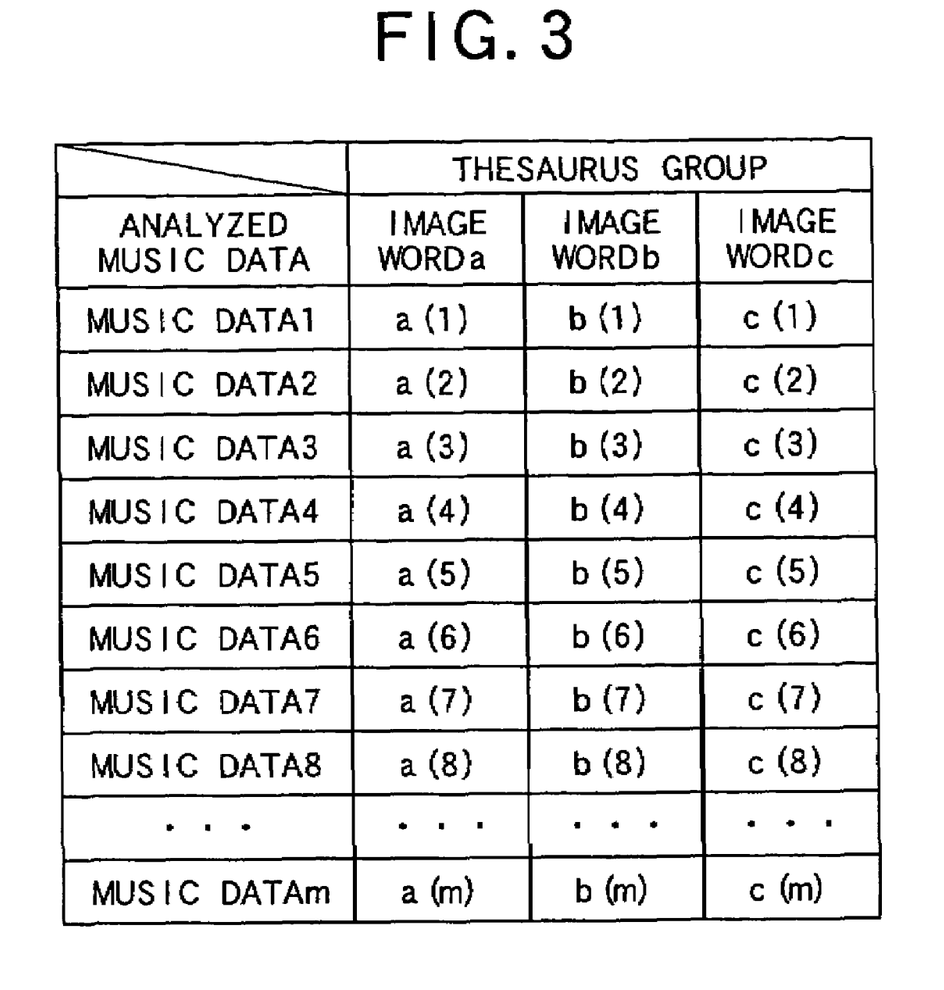
FIG. 3 is a diagram to describe the correction process of an image word list generation portion according to an embodiment.

FIG. 3 is a diagram intended to describe the correction process of the image word list generation portion 143 according to this embodiment.

The keyword reproduction which reproduces the music matching with sensitivity of the user is implemented based on the set-up keyword and the appearance frequency of the image word in the music data. For this reason, it is necessary, for the sake of accurately performing the keyword reproduction, to accurately detect he appearance frequency of the image word in the music data.

In the past, the thesaurus analysis of the image word was performed based on the lyrics data included in the music data so that the appearance frequency was detected by each image word (thesaurus group) in each piece of the music data.

For instance, in the case of performing the thesaurus analysis of m tunes with the image words a, b and c as shown in FIG. 3, $a_1$ pieces of the image word a, $b_1$ pieces of the image word b and $c_1$ pieces of the image word c are detected in a first tune of the music data.

In the case of performing the keyword reproduction based on as-is detection results, however, the appearance frequency of each image word is not adjusted so that accurate keyword reproduction cannot be performed.

To be more specific, the keyword reproduction is intended to select the music data matching with sensitivity of the user based on the appearance frequency of the image word. Therefore, if there is the image word of which appearance frequency is high in the entire music data, the image word of a generally low appearance frequency is not considered on the selection so that a biased selection is made based on the image word of a high appearance frequency.

For instance, there are ordinarily a lot of lyrics singing about "romance" in the music data. To be more precise, there are a lot of image words relating to the "romance" in the lyrics included in the music data so that the appearance frequency thereof becomes high. Even if a large number of the image words about the "romance" appear, however, the image words do not necessarily represent a large information amount indicating a characteristic quality of the music data.

The image word of a low appearance frequency such as "destiny" basically represents a characteristic quality of the music data. In the case of selecting the music data simply by a detected appearance frequency, however, the image word of a low appearance frequency is not taken into consideration as to the selection so that the music data matching with sensitivity of the user will not be selected.

Thus, according to this embodiment, the information amount of each image word is calculated by using the technique of entropy, and the appearance frequency of each image word in the music data is corrected based on the calculated information amount.

The image word of a low appearance probability is supposedly the information difficult to predict for the music data including the image word, and so the image word represents a larger information amount. The image word of a high appearance frequency represents a smaller information amount for the music data including the image word. Therefore, according to this embodiment, the entropy is calculated for each image word of the music data, and the appearance frequency of each image word is weighted based on the calculated entropy so as to calculate the appearance frequency of the image word based on the information amount of each image word of the music data.

To be more precise, the image word list generation portion uses [Formula 1] to calculate an overall appearance frequency L of the music data in the set-up range, that is, all the music data morphologically analyzed by the morphological analysis portion 142. And it calculates an appearance probability P of each image word (thesaurus group) based on the calculated overall appearance frequency L as shown in [Formula 2].

[Formula 1] (Formula 1)

$$L = \left(\sum_{j=1}^{m} a_j + \sum_{j=1}^{m} b_j + \sum_{j=1}^{m} c_j\right)$$

[Formula 2] (Formula 2)

$$P(a) = \left(\sum_{j=1}^{m} a_j / L\right)$$

$$P(b) = \left(\sum_{j=1}^{m} b_j / L\right)$$

$$P(c) = \left(\sum_{j=1}^{m} c_j / L\right)$$

Here, the overall appearance frequency L is calculated as to the image words a, b and c, where a, b and c denote the image words detected in the music data, and P (a), P (b) and P (c) denote the appearance frequencies of the image words a, b and c viewed from the entire music data. In addition, m denotes the number of pieces of the music data.

The image word list generation portion 143 calculates entropy H of each image word by [Formula 3] based on the appearance probability P of the image word, and calculates a correction value of the appearance frequency of each image word in the music data with the entropy H of each image word by using [Formula 4].

$$H(a)=P(a)\times(-\log_2 P(a))$$

$$H(b)=P(b)\times(-\log_2 P(b))$$

$$H(c)=P(c)\times(-\log_2 P(c)) \quad \text{(Formula 3)}$$

$$\alpha_j = a_j \times C(a) \times \omega$$

$$\beta_j = b_j \times H(b) \times \omega$$

$$\gamma_j = c_j \times H(c) \times \omega (j=1, 2, 3, \ldots m) \quad \text{(Formula 4)}$$

ω denotes a constant, and $\alpha_j$, $\beta_j$ and $\gamma_j$ denote the corrected appearance frequencies of the image words a, b and c in the music data.

According to this embodiment, the appearance frequencies of the image words in the music data are thus corrected, and the data is determined based on the corrected appearance frequencies of the image words in the music data.

Next, the normalization process and the correlation value calculation process in the correlation value calculation portion 153 according to this embodiment will be described by using FIG. 4.

Figure 4:
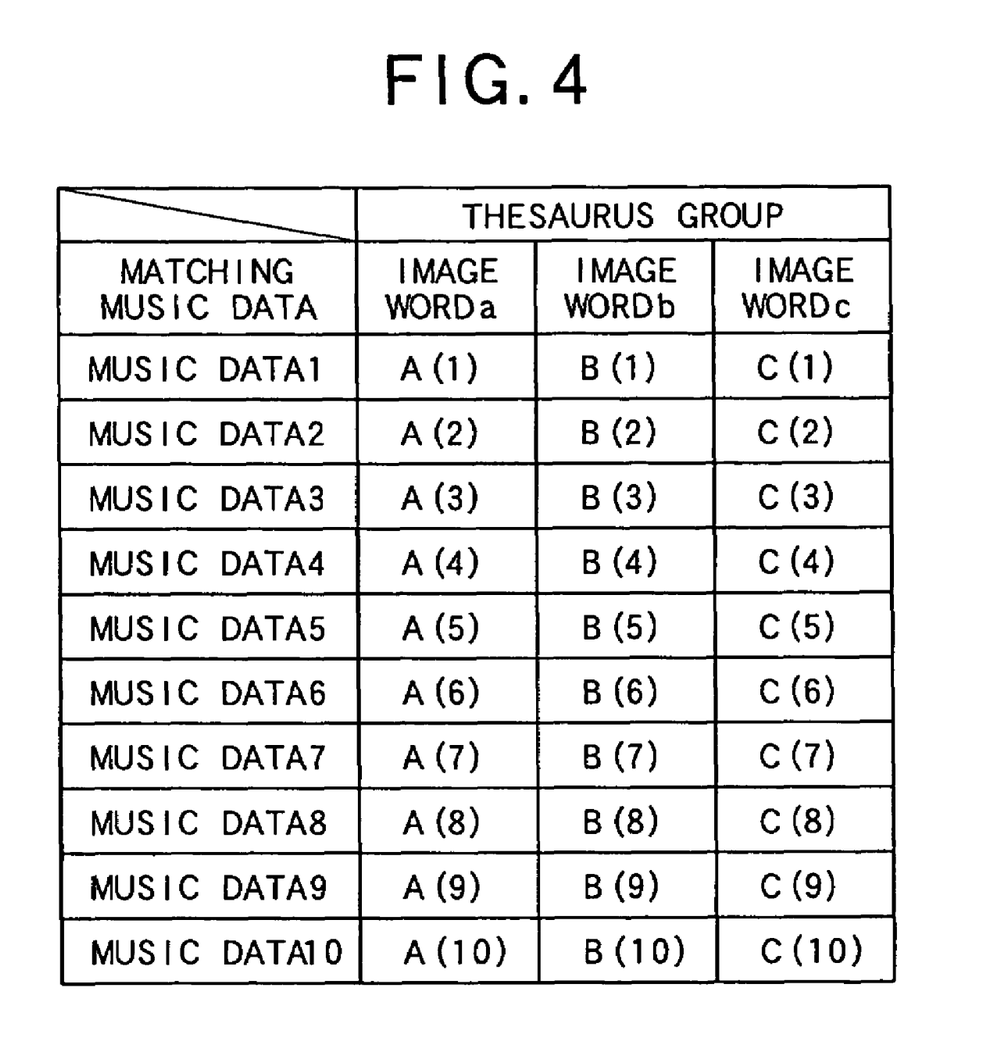
FIG. 4 is a diagram to describe a normalization process in a correlation value calculation portion according to an embodiment.

FIG. 4 is a diagram intended to describe the normalization process in the correlation value calculation portion 153.

As described above, the correlation value calculation portion 153 performs the normalization process to the inputted image word list of the music data, and also performs the correlation value calculation process in which it calculates the correlation value of the keyword of the normalized image word list.

As described above, the image word list is ordinarily calculated for each piece of the music data, and so a data amount of the lyrics data, that is, length of the lyrics is not taken into consideration. Therefore, the music data of long lyrics has a higher appearance frequency in the image word than the music data of short lyrics, and so the music data cannot be accurately determined in the case of determining the music data matching with the keyword based on the image word as mentioned above.

Thus, according to this embodiment, the normalization process is performed to the appearance frequencies of the image words in the music data in order to resolve a difference in the data amount of the lyrics data. And the correlation value process is performed as follows based on the appearance frequencies of the image words in the normalized music data.

To be more precise, according to this embodiment, the correlation value calculation portion 153 has the appearance frequency of each image word in each tune divided by the overall appearance frequency of each image word in each tune and performs the normalization by using the appearance frequency of each image word in the music data by each music data group determined to match with the keyword by the user (hereafter, simply referred to as a matching music data group) and each music data group determined not to match with the keyword by the user (hereafter, simply referred to as a non-matching music data group).

For instance, in the case of performing the normalization process to the music data group matching with the appearance frequencies $\alpha_j$, $\beta_j$ and $\gamma_j$ of the image words in the music data after correcting the information amount, appearance correction values $A_j$, $B_j$ and $C_j$ of the image words in the music data are calculated by using [Formula 5] as shown in FIG. 4.

[Formula 5] (Formula 5)

$$A_j = \alpha_j \Big/ \sum_{j=1}^{m} (\alpha_j + \beta_j + \gamma_j)$$

$$B_j = \beta_j \Big/ \sum_{j=1}^{m} (\alpha_j + \beta_j + \gamma_j)$$

$$C_j = \gamma_j \Big/ \sum_{j=1}^{m} (\alpha_j + \beta_j + \gamma_j) \quad (j = 1, 2, 3, \ldots m)$$

According to this embodiment, as shown in [Formula 6] and [Formula 7], the correlation value calculation portion 153 calculates a total sum $S_1$ of the appearance correction values of the image words in the music data of the latest P tunes (for instance, 10 tunes in the case of this embodiment) matching with the normalized appearance correction values, a value $S_2$ in proportion to an mean deviation value calculated for each image word of the latest P tunes matching therewith, a total sum $S_3$ of the appearance correction values of the image words in all the music data not matching therewith, and a value $S_4$ in proportion to the mean deviation value calculated for each image word of the latest P tunes not matching therewith. As shown in [Formula 8], it calculates the total sum of these values and thereby calculates the correlation value of the keyword of each image word.

[Formula 6] (Formula 6)

$$S_1(a) = S_3(a) = \sum a = \sum_{j=1}^{P} A_j$$

$$S_1(b) = S_3(b) = \sum b = \sum_{j=1}^{P} B_j$$

-continued $$S_1(c) = S_3(c) = \sum c = \sum_{j=1}^{P} C_j$$

$S_2(a)=S_4(a)=\text{Mdev}(a) \times k = \Sigma(|A_j-\text{Ave}(A)|/P) \times k$ $S_2(b)=S_4(b)=\text{Mdev}(b) \times k = \Sigma(|B_j-\text{Ave}(B)|/P) \times k$ $S_2(c)=S_4(c)=\text{Mdev}(c) \times k = \Sigma(|C_j-\text{Ave}(C)|/P) \times k$ (Formula 7)

$S(a)=S_1(a)+S_2(a)+S_3(a)+S_4(a)$ $S(b)=S_1(b)+S_2(b)+S_3(b)+S_4(b)$ $S(c)=S_1(c)+S_2(c)+S_3(c)+S_4(c)$ (Formula 8)

S (a), S (b) and S (c) denote the correlation values to the keywords of the image words a, b and c, and Mdev (a) Mdev (b) and Mdev (c) denote the mean deviations of the image words a, b and c after the correction. In addition, Ave (A) Ave (B) and Ave (C) denote average appearance values of the appearance correction values $A_j$, $B_j$ and $C_j$.

As described above, the correlation value calculation portion 153 according to this embodiment calculates the correlation values to the music data outputted via the second data obtaining portion 152 each time the new music data is determined by the keyword determination portion 151, and always calculates the correlation value of each image word of the keyword based on the latest music data determined by the keyword determination portion 151.

Furthermore, in the case of a positive correlation, that is, in the case where the average is 0.5 or more (in the case where the values of the image words are two values of "0" and "1") and the deviation is small, the correlation values $S_2$ and $S_4$ take positive values. And in the case of a negative correlation, that is, in the case where the average is below 0.5 and the deviation is small, the correlation values $S_2$ and $S_4$ take negative values.

As described above, according to this embodiment, the correlation value calculation portion 153 calculates the correlation values, and the score calculation portion 154 calculates the score data from the correlation values.

To be more precise, as shown in [Formula 9], the score calculation portion 154 multiplies $A_j$, $B_j$ and $C_j$ (J=1, 2, 3 ... m) wherein the appearance frequency of each image word in the music data is corrected by the information amount, and normalized by the correlation value of each image word of the keyword by each piece of the music data and adds the image words multiplied by the correlation value so as to generate score data T.

$T=S(a) \times A_j+S(b) \times B_j+S(c) \times C_j$ (Formula 9)

Next, a description will be given by using FIG. 5 as to the operation of the keyword reproduction according to this embodiment.

Figure 5:
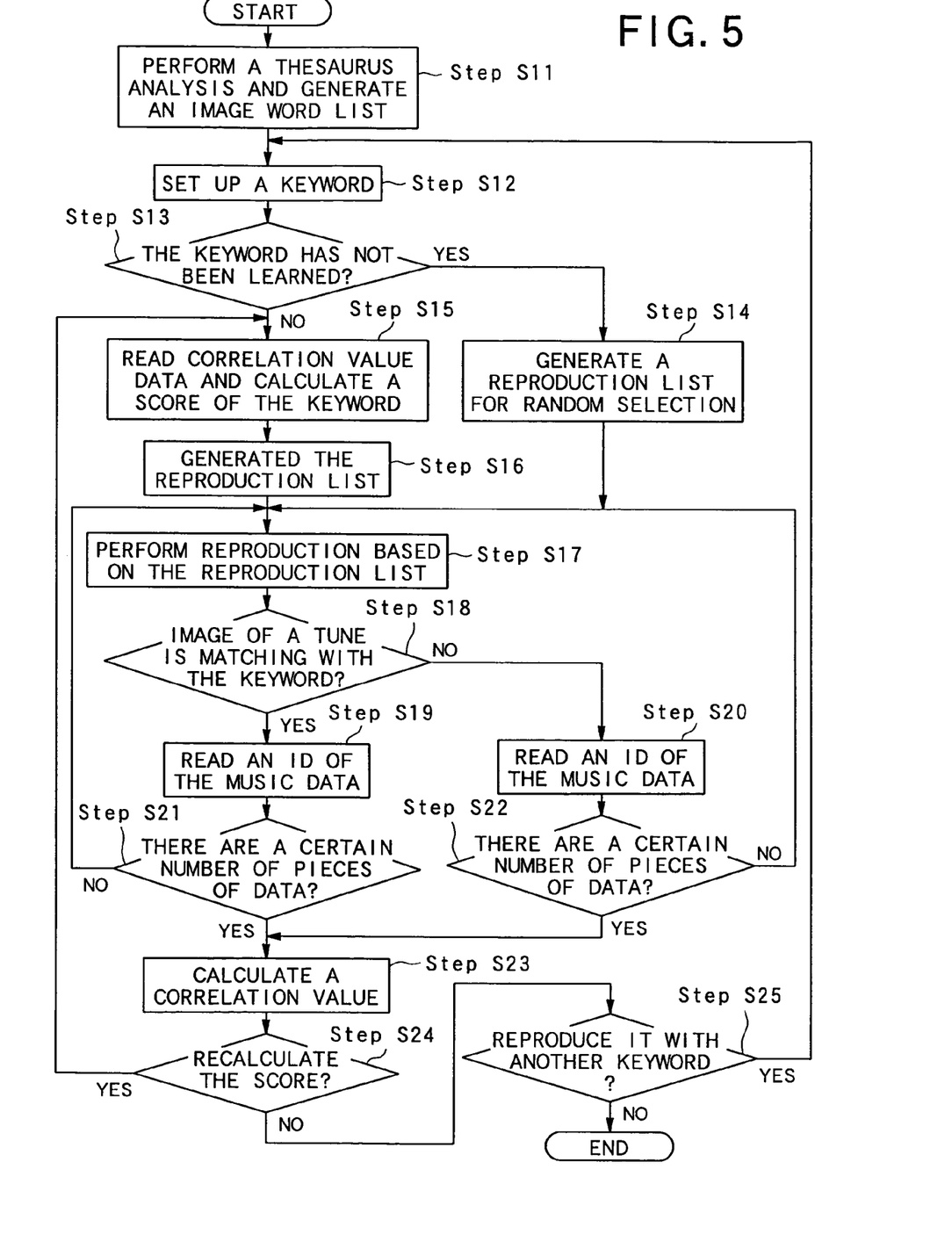
FIG. 5 is a flowchart showing an operation of a keyword reproduction according to an embodiment.

FIG. 5 is a flowchart showing the operation of the keyword reproduction according to this embodiment.

According to this embodiment, the correction process, the normalization process and the correlation value calculation process are performed on performing the keyword reproduction.

First, if the instruction to perform the keyword reproduction is registered with the system control portion 240 via the operation portion 160 by the user, the system control portion 240 has set-up music data read piece by piece and has the thesaurus analysis performed to the read music data so as to generate the image word list (step S11).

To be more precise, the system control portion 240 has preset music data read piece by piece by the first data obtaining portion 141 from the data storage portion 130 and the optical disk 300 accommodated in the optical disk drive 120. It also has the thesaurus analysis performed to each piece of the read music data by the morphological analysis portion 142, and has the image word list generated by the image word list generation portion 143 based on the read music data and the appearance frequencies of the image words detected by the thesaurus analysis.

The morphological analysis portion 142 performs this process (step S11) at any time in the case where it determines that a new tune is added.

Next, the system control portion 240 provides a notification to prompt the user to input the keyword as a standard of the keyword reproduction via the display portion 190 or the speaker 230. In the case where the keyword is set up and registered, it stores the keyword in the keyword determination portion 151 (step S12), and determines whether or not the keyword has been previously used (step S13).

To be more precise, the system control portion 240 searches the ROM/RAM 250 to determine whether or not the keyword has the correlation value data. To be more specific, in the case where the correlation value data of the keyword is stored in the ROM/RAM 250, it is determined to be a previously used keyword which has been learned.

In this process, the system control portion 240 may also set up a reproduction range to perform the keyword reproduction in addition to setting up the keyword. For instance, it is possible to set up, as selection subjects of the keyword reproduction, only the music data stored in the data storage portion 130 or only the music data stored in the optical disk 300 in the optical disk drive 120 for instance.

In the case where the keyword registered with the system control portion 240 is the keyword registered for the first time, the system control portion 240 generates the reproduction list of the preset music data or randomly selected music data (step S14).

In the case where the keyword registered with the system control portion 240 is determined to be the previously used keyword which has been learned, the system control portion 240 reads the correlation value data of each image word of the registered keyword from the ROM/RAM 250 so as to have the score of the music data calculated by the score calculation portion 154 (step S15).

To be more precise, the score calculation portion 154 obtains the analytical data of the music data stored in the data storage portion 130 or the optical disk 300 from the ROM/RAM 250 and also obtains the correlation value data of the set-up keyword. And as described above, it calculates the score of each piece of the music data based on the analytical data and the correlation value data.

The score calculation portion 154 calculates the score of the music data existing in the reproduction range of the preset music data or the selection range of the music data set up on registration of the keyword.

In the case where the music data is added afterward, the score calculation portion 154 can also obtain the analytical data of the added music data.

Next, the system control portion 240 generates the reproduction list matching with the set-up keyword in the reproduction list generation portion 155 based on the scores of the music data calculated by the score calculation portion 154, and notifies the user of the generated reproduction list via the display portion 190 or the speaker 230 (step S16).

To be more precise, the reproduction list generation portion 155 generates the reproduction list in order of decreasing score.

The reproduction list generation portion 155 may also delete the music data not reaching a preset certain characteristic amount without adding it to the reproduction list.

Next, the system control portion 240 starts the reproduction of the music data based on the reproduction list, and amplifies each piece of the music data according to the reproduction list via the speech processing circuit 220 and the speaker 230 (step S17).

The system control portion 240 reproduces the music data from high order in the reproduction list or based on the selection of the user.

The system control portion 240 may also intentionally modify the reproduction list based on the calculated scores. For instance, it is also possible to reproduce the music data in order from the music data of low order to that of high order, such as a tenth piece, a ninth piece, an eighth piece . . . of the music data in the reproduction list.

In this case, reproduction order of the music data in the reproduction list is set up via the operation portion 160 or the voice recognition circuit 180 for instance on performing the keyword reproduction or during the keyword reproduction.

Next, the system control portion 240 has the determination made by the user as to whether or not the reproduced music data is the music data matching with the keyword via the data determination portion 150 during or after the music data reproduction (step S18), and stores an identification number (ID) of the music data inside the data determination portion 150 (steps S19 and S20).

To be more precise, the system control portion 240 has the determination made as to whether it is the music data group matching with the keyword or the music data group not matching therewith via the data determination portion 150, and stores the identification number (ID) of each of the music data groups inside the data determination portion 150.

Next, the system control portion 240 has the data determination portion 150 make the determination as to whether or not the predetermined number of pieces of music data have been determined (steps S21 and S22). If the data determination portion 150 determines that the predetermined number of pieces of music data have not been determined, that is, if it determines that the predetermined number of pieces of music data are not stored in the internal memory, the system control portion 240 moves on to the step S17 in order to reproduce the music data based on the reproduction list.

In the case where the data determination portion 150 determines that the predetermined number of pieces of music data have been determined, that is, if it determines that the predetermined number of pieces of music data are stored in the internal memory, the system control portion 240 has the correlation value calculation portion 153 calculate the correlation value of each image word of the set-up keyword (step S23).

To be more precise, the system control portion 240 has the correlation value calculation portion 153 obtain the analytical data of the music data obtained from the ROM/RAM 250 and perform the normalization process and the correlation value calculation process to the analytical data of the music data as described above.

The correlation value calculated in this process is stored in the ROM/RAM 250 by associating it with the set-up keyword as the correlation value data. In the case where the keyword already has the correlation value data, that data is overwritten and stored.

Next, the system control portion 240 provides the notification to prompt the user to determine whether or not to regenerate the reproduction list based on the new correlation value data via the display portion 190 or the speaker 230 (step S24). In the case where the user registers the selection of regeneration of the reproduction list, that is, in the case where the instruction to regenerate the reproduction list is registered with the system control portion 240, the system control portion 240 moves on to the step S15.

In the case where the user registers the selection of no regeneration of the reproduction list, that is, in the case where the instruction to regenerate no production list is registered with the system control portion 240, the system control portion 240 provides the notification to prompt the user to determine whether or not to perform the keyword reproduction with another keyword via the display portion 190 or the speaker 230 (step S25). In the case where the user registers the keyword reproduction with another keyword, that is, in the case where the instruction to perform the keyword reproduction with another keyword is registered with the system control portion 240, the system control portion 240 moves on to the step S12.

In the case where the user registers no keyword reproduction with another keyword, that is, in the case where the instruction to perform no keyword reproduction with another keyword is registered with the system control portion 240, the system control portion 240 finishes this operation.

Thus, according to this embodiment, the keyword reproduction is performed so that it is possible, by repeating this operation, to select the music data by the image word which the user determines to be highly correlated with the keyword.

As described above, this embodiment comprises the data storage portion 130 storing a plurality of pieces of music data, the optical disk drive 120 which reads the music data from the optical disk 300 storing a plurality of pieces of music data, the operation portion 160, voice recognition circuit 180 and system control portion 240 which set up the keyword as the standard of the selection of the music data to be reproduced in the case of selecting the music data to be reproduced from the stored plurality of pieces of music data, the data analysis portion 140 which detects at least the appearance frequency of the image word included in the music data by each piece of the stored music data, the data analysis portion 140 which calculates the overall appearance frequency of the detected image word in the stored plurality of pieces of music data based on the appearance frequency of the image word included in the detected music data, and corrects the appearance frequency of the image word included in the music data based on the calculated overall appearance frequency of the image word and the data determination portion 150 which selects the music data matching with the set-up keyword from the stored music data based on the set-up keyword and the calculated appearance frequency of the image word in the music data.

According to this embodiment, because of this configuration, the appearance frequency of the image word included in the music data is detected by each piece of the stored music data, and the overall appearance frequency is calculated by the detected image word in the stored plurality of pieces of music data based on the detected appearance frequency of the image word included in the music data, and the appearance frequency of the image word included in the music data is calculated based on the calculated overall appearance frequency of the image word.

Ordinarily, in the case where the music data of several hundred to several thousand tunes is stored in the data storage portion 130 and a recording medium, the user cannot easily select his or her desired piece of music data from the tunes.

Thus, according to this embodiment, it is possible for the user, by setting up the keyword, to select his or her desired piece of music data based on an accurately calculated appearance frequency of the image word. Therefore, it is possible to easily select the user's desired piece of music data and accurately reproduce the music data matching with the set-up keyword.

In addition, according to this embodiment, the data analysis portion 140 calculates the overall appearance frequency of the detected image word in the stored plurality of pieces of music data based on the detected appearance frequency of the image word included in the music data. And the data analysis portion 140 is comprised of the image word list generation portion 143 which calculates the information amount of the detected image word based on the calculated overall appearance frequency, and the image word list generation portion 143 and the morphological analysis portion 142 which calculate the appearance frequency of the image word against the overall appearance frequency based on the calculated information amount of the image word and correct the appearance frequency.

According to this embodiment, because of this configuration, the overall appearance frequency is calculated by the detected image word in the stored plurality of pieces of music data based on the appearance frequency of the detected image word included in the music data, and the information amount of the detected image word is calculated based on the calculated overall appearance frequency. In addition, the appearance frequency of the image word against the overall appearance frequency is calculated based on the calculated information amount thereof, and so it is possible to reproduce the music data of the keyword set up based on the information amount of the image word included in the music data.

Therefore, it is possible to take no image word of a high appearance frequency in the entire music data into consideration and take the image word of a low appearance frequency in the entire music data into consideration so as to easily select the user's desired piece of music data and accurately reproduce the music data matching with the set-up keyword.

According to this embodiment, the image word list generation portion 143 calculates the appearance probability of the image word based on the overall appearance frequency of the detected image word in the stored plurality of pieces of music data, and calculates the information amount of the detected image word based on the calculated appearance probability of the image word.

According to this embodiment, it is possible, because of this configuration, to calculate the appearance probability of the image word based on the overall appearance frequency of the image word in the stored plurality of pieces of music data so as to calculate accurate appearance probability of the image word and accurately reproduce the music data matching with the set-up keyword.

According to this embodiment, the image word list generation portion 143 calculates the information amount of the detected image word calculated based on the appearance probability of the detected image word, and outputs the information amount as the entropy.

According to this embodiment, it is possible, because of this configuration, to calculate as the entropy the information amount of the detected image word calculated based on the appearance probability of the detected image word. Therefore, it is possible to emphasize and characterize the appearance frequency of the image word representing a subtle difference in the sensitivity of each individual so as to accurately reproduce the music data matching with the set-up keyword.

According to this embodiment, the data analysis portion 140 performs the thesaurus analysis based on the image word set in advance, and detects the appearance frequency of the image word in the music data by the thesaurus analysis.

According to this embodiment, because of this configuration, the thesaurus analysis is performed based on the image word set in advance, and the appearance frequency of the image word in the music data is detected by the thesaurus analysis.

There are ordinarily many image words in the lyrics data. Therefore, to simply analyze the appearance frequency of each image word included in the lyrics data, it is necessary to detect a majority of the image words and the appearance frequencies thereof so that the analysis results cannot be easily used. To be more specific, data processing to connect each image word to the keyword becomes more cumbersome as the number of detected image words increases so that the analysis results cannot be easily used. Thus, the analysis results can be easily used and the accurate appearance frequency of the image words can be calculated by performing the thesaurus analysis.

Therefore, it is possible to easily select the user's desired piece of music data and accurately reproduce the music data matching with the set-up keyword.

This embodiment comprises the data storage portion 130 storing a plurality of pieces of music data, the optical disk drive 120 which reads the music data from the optical disk 300 storing a plurality of pieces of music data, the operation portion 160, the voice recognition circuit 180 and the system control portion 240 which set up the keyword as the standard of the selection of the music data to be reproduced in the case of selecting the music data to be reproduced from the stored plurality of pieces of music data, the data analysis portion 140 which detects at least the appearance frequency of the image word included in the music data by each piece of the stored music data, the keyword determination portion 151 which obtains determination information indicating whether or not the stored music data matches with the set-up keyword, and the data determination portion 150 which calculates the correlation value between the set-up keyword and the detected image word based on the obtained determination information and the detected image word of the music data, calculates the appearance frequency of the image word included in the music data of the set-up keyword based on the calculated correlation value, and selects the music data matching with the set-up keyword from the stored music data based on the set-up keyword and the calculated appearance frequency of the image word in the music data.

According to this embodiment, because of this configuration, the correlation value between the set-up keyword and the detected image word is calculated based on the determination information indicating whether or not the stored music data matches with the set-up keyword and the image word of the music data, and the appearance frequency of the image word included in the music data of the set-up keyword is calculated based on the calculated correlation value, and then the music data matching with the set-up keyword is selected based on the set-up keyword and the calculated appearance frequency of the image word in the music data.

Ordinarily, the keyword and the sense of grasping the keyword are different among individuals. Therefore, if the user is different, the music data to be selected by the same keyword is different.

Therefore, according to this embodiment, it is possible to accurately calculate the correlation value between the keyword and the music data so that, once the keyword is set up, the music data accurately matching with the user's sense can be set up. Consequently, it is possible to easily select the user's desired piece of music data and accurately reproduce the music data matching with the set-up keyword for each user.

The data determination portion 150 obtains the determination information indicating whether or not the selected music data matches with the set-up keyword as to the music data of which selection list has been generated, and calculates the correlation value based on the obtained determination information and calculates the appearance frequency of the image word included in the music data of the set-up keyword, and also selects the music data matching with the set-up keyword from the stored music data based on the set-up keyword and the calculated appearance frequency of the image word in the music data.

Because of this configuration, the determination information is obtained as to the music data of which reproduction list has been generated, the correlation value is calculated based on the obtained determination information, and the appearance frequency of the image word included in the music data of the keyword is calculated. And the music data matching with the set-up keyword is selected from the stored music data based on the keyword and the calculated appearance frequency of the image word in the music data.

Therefore, it is possible to determine whether or not the music data matching with the keyword is further matching therewith, and so the music data can be selected by the image word which the user determines to be highly correlated with the keyword. Thus, it is possible to easily select the user's desired piece of music data and accurately reproduce the music data matching with the set-up keyword for each user.

According to this embodiment, in the case where at least the predetermined number of pieces of the stored music data are selected as the music data to be reproduced by the keyword, the data determination portion 150 calculates the overall appearance frequency of the detected image word in the selected plurality of pieces of music data based on the obtained determination information and calculates the mean deviation of the detected image word of which overall appearance frequency has been calculated. And the data determination portion 150 is comprised of the correlation value calculation portion 153 which at least calculates the correlation value between the keyword and the detected image word based on the calculated overall appearance frequency and mean deviation and the score calculation portion 154 which calculates the appearance frequency of the detected image word included in the music data of the set-up keyword based on the calculated correlation value.

According to this embodiment, because of this configuration, the correlation value between the keyword and the image word is calculated based on the overall appearance frequency of the detected image word in the plurality of pieces of music data selected based on the obtained determination information and the mean deviation of the detected image word of which overall appearance frequency has been calculated. And the appearance frequency of the detected image word included in the music data of the set-up keyword is calculated based on the calculated correlation value.

Therefore, according to this embodiment, it is possible to accurately calculate the correlation value between the keyword and the music data so that, once the keyword is set up, the music data accurately matching with the user's sense can be set up and the user's desired piece of music data can be easily selected. Consequently, it is possible to accurately reproduce the music data matching with the set-up keyword for each user.

According to this embodiment, in the case where the information on the music data group matching with the keyword and the music data group not matching therewith is obtained by the keyword determination portion 151, the correlation value calculation portion 153 calculates the overall appearance frequency and mean deviation by each of the music data group matching with the keyword and the music data group not matching therewith.

According to this embodiment, because of this configuration, the correlation value calculation portion 153 calculates the overall appearance frequency and mean deviation by each of the music data group matching with the keyword and the music data group not matching therewith.

Therefore, according to this embodiment, it is possible to accurately calculate the correlation value between the keyword and the music data so that, once the keyword is set up, the music data accurately matching with the user's sense can be set up and the user's desired piece of music data can be easily selected. Consequently, it is possible to accurately reproduce the music data matching with the set-up keyword for each user.

According to this embodiment, the correlation value calculation portion 153 normalizes the appearance frequency of the detected image word included in the music data and calculates the correlation value between the keyword and the image word based on the appearance frequency of the normalized image word.

Therefore, according to this embodiment, it is possible to accurately calculate the correlation value between the keyword and the music data so that, once the keyword is set up, the music data accurately matching with the user's sense can be set up and the user's desired piece of music data can be easily selected. Consequently, it is possible to accurately reproduce the music data matching with the set-up keyword for each user.

According to this embodiment, the keyword reproduction is performed based on the keyword set up by the user. It is also possible, however, to perform the reproduction by obtaining biological information of the user such as a heart rate and determining the search key of the music data to be reproduced based on the biological information.

It is also possible to perform the reproduction by determining the search key based on driving information such as vehicle speed and other information obtained from the on-vehicle electronics device 100.

According to this embodiment, the technique of the entropy is used to calculate the appearance frequency of each image word, and the appearance frequency of each image word in the music data is corrected based on the calculated appearance frequency. It is also possible, however, to correct the appearance frequency by using statistical processing.

In this case, it is also possible to calculate a grand total of each image word in all the music data and acquire a standard deviation ($\delta$) and a variance ($\delta^2$) based on an average from the calculated grand total so as to determine the information amount of each image word based on a preset threshold, so that a correction amount is determined based on the determined information amount and the appearance frequency of the image word in the music data is corrected.

According to this embodiment, the keyword determination portion 151 determines the music data until the number of either the tunes matching or not matching with each keyword becomes ten or more. It is also possible, however, to determine the music data not limiting it to ten tunes but by the number of tunes more or less than that.

In this case, the user sets up the necessary number of tunes for the determination via the operation portion 160, for instance.

According to this embodiment, the score of the music data belonging to the selection range is calculated as to the latest ten tunes determined by the keyword determination portion 151. It is also possible, however, to calculate the score of the music data based on the score calculated as to the latest ten tunes and the score calculated in the past.

For instance, it is also possible to calculate the average of a currently set score and the scores of a certain number of times in the past so as to render the average thereof as the score of the music data. It is possible, by thus calculating the score, to generate the reproduction list of the music data reflecting the user's feelings in the past.

According to the keyword reproduction of this embodiment, the correction process, the normalization process and the correlation value calculation process are performed on the keyword reproduction. It is also possible, however, to perform the correction process, the normalization process and the correlation value calculation process before performing the keyword reproduction respectively.

According to this embodiment, the keyword reproduction is performed while performing the correction process, the normalization process and the correlation value calculation process. Once the keyword reproduction is performed with an arbitrary keyword, it is also possible, as a matter of course, to have the correlation value data of that keyword calculated so as to perform the keyword reproduction just by using the correlation value data.

According to this embodiment, the keyword reproduction is performed by the above-mentioned on-vehicle electronics device 100. It is also possible, however, to provide a computer and an information recording medium to the recording medium which stores the music data and the reproducing apparatus thereof or the music data reproducing apparatus having the data storage portion 130 which stores the music data and store in the information recording medium a program which performs the above-mentioned keyword reproduction operation so as to read the program with the computer and thereby perform the keyword reproduction operation as described above.

According to this embodiment, the keyword reproduction is performed based on the keyword. It is also applicable, however, to the navigation apparatus and other music data reproducing apparatuses which set up the search key based on not only the keyword but also the image data and other data and perform the above-mentioned reproduction based on the search key.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-115880 filed on Apr. 21, 2003 including the specification, claims, drawings and summary is incorporated herein by reference in its entirety.

What is claimed is:

1. A music data selection apparatus comprising:
   at least one of a storage device which has a plurality of pieces of music data stored thereon and a reading device which reads the music data from a storage medium which has a plurality of pieces of music data recorded thereon;
   a setting device which sets a search key as a standard of selection of the music data to be reproduced in the case of selecting the music data to be reproduced from the stored plurality of pieces of music data;
   a detection device which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;
   an appearance frequency calculation device which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and
   a selection device which selects the music data matching with the set search key from the stored music data based on the set search key and the calculated appearance frequency of the image word in the music data.

2. The music data selection apparatus according to claim 1, wherein the appearance frequency calculation device has:
   an overall appearance frequency calculation device which calculates the overall appearance frequency of the detected image word in the stored plurality of pieces of music data based on the appearance frequency of the image word included in the detected music data;
   an information amount calculation device which calculates an information amount of the detected image word based on the calculated overall appearance frequency; and
   a frequency calculation device which calculates and corrects the appearance frequency of the image word against the overall appearance frequency based on the calculated information amount of the image word.

3. The music data selection apparatus according to claim 2, wherein the information amount calculation device calculates appearance probability of the image word based on the overall appearance frequency of the detected image word in the stored plurality of pieces of music data, and calculates the information amount of the detected image word based on the calculated appearance probability of the image word.

4. The music data selection apparatus according to claim 3, wherein the information amount calculation device calculates as entropy the information amount of the detected image word calculated based on the appearance probability of the detected image word.

5. The music data selection apparatus according to claim 1, wherein the detection device performs the thesaurus analysis based on the image word set in advance, and detects the appearance frequency of the image word in the music data by the thesaurus analysis.

6. A music data selection apparatus comprising:
   at least one of a storage device which has a plurality of pieces of music data stored thereon and a reading device which reads the music data from a storage medium which has a plurality of pieces of music data stored thereon;
   a setting device which sets a search key as a standard of selection of the music data to be reproduced in the case of selecting the music data to be reproduced from the stored plurality of pieces of music data;

a detection device which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;

a determination information obtaining device which obtains determination information indicating whether or not the stored music data matches with the set search key;

an appearance frequency calculation device which calculates a correlation value between the set search key and the detected image word based on the obtained determination information and the detected image word of the music data, and calculates the appearance frequency of the image word included in the music data in the set search key based on the calculated correlation value; and a selection device which selects the music data matching with the set search key from the stored music data based on the set search key and the calculated appearance frequency of the image word in the music data.

7. The music data selection apparatus according to claim 6, wherein the determination information obtaining device obtains determination information on the music data selected by the selection device indicating whether or not the selected music data matches with the set search key;

the appearance frequency calculation device calculates the correlation value based on the obtained determination information and calculates the appearance frequency of the image word included in the music data in the set search key; and the selection device selects the music data matching with the set search key from the stored music data based on the set search key and the calculated appearance frequency of the image word in the music data.

8. The music data selection apparatus according to claim 6, wherein, in the case where at least a predetermined number of pieces of the stored music data are selected as the music data to be reproduced by the search key, the appearance frequency calculation device has:

an overall appearance frequency calculation device which calculates the overall appearance frequency of the detected image word in the selected plurality of pieces of music data based on the obtained determination information;

a standard deviation calculation device which calculates a standard deviation of the detected image word of the calculated overall appearance frequency;

a correlation value calculation device which calculates a correlation value between the search key and the detected image word based on at least the calculated overall appearance frequency and the standard deviation; and a frequency calculation device which calculates the appearance frequency of the detected image word included in the music data in the set search key based on the calculated correlation value.

9. The music data selection apparatus according to claim 8, wherein, in the case where the determination information obtaining device obtains information on a music data group matching with the search key and the music data group not matching therewith, the overall appearance frequency calculation device and the standard deviation calculation device calculate the overall appearance frequency and the standard deviation by each of the music data group matching with the set search key and the music data group not matching therewith.

10. The music data selection apparatus according to claim 6, wherein the music data selection apparatus comprises a normalization device which normalizes the appearance frequency of the image word included in the music data detected by the detection device, and the correlation value calculation device calculates the correlation value between the search key and the image word based on the appearance frequency of the normalized image word.

11. A music data selection method comprising:

a reading process which reads music data from one of a storage device which has a plurality of pieces of music data stored thereon and a storage medium which has a plurality of pieces of music data recorded thereon;

a setting process which sets a search key as a standard of selection of the music data to be reproduced in the case of selecting the music data to be reproduced from the stored plurality of pieces of music data;

a detection process which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;

an appearance frequency calculation process which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and a selection process which selects the music data matching with the set search key from the stored music data based on the set search key and the calculated appearance frequency of the image word in the music data.

12. A music data selection method comprising:

a reading process which reads the music data from one of a storage device which has a plurality of pieces of music data stored thereon and a storage medium which has a plurality of pieces of music data stored thereon;

a setting process which sets a search key as a standard of selection of the music data to be reproduced in the case of selecting the music data to be reproduced from the stored plurality of pieces of music data;

a detection process which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;

a determination information obtaining process which obtains determination information indicating whether or not the stored music data matches with the set search key;

an appearance frequency calculation process which calculates a correlation value between the set search key and the detected image word based on the obtained determination information and the detected image word of the music data, and calculates the appearance frequency of the image word included in the music data in the set search key based on the calculated correlation value; and a selection process which selects the music data matching with the set search key from the stored music data based on the set search key and the calculated appearance frequency of the image word in the music data.

13. An information recording medium on which a music data selection program is computer-readably recorded, wherein the music data selection program causes a computer to function as:

a reading device which reads music data from one of a storage device which has a plurality of pieces of music data stored thereon and a storage medium which has a plurality of pieces of music data stored thereon;

a setting device which sets a search key as a standard of selection of the music data to be reproduced in the case of selecting the music data to be reproduced from the stored plurality of pieces of music data;

a detection device which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;

an appearance frequency calculation device which calculates an overall appearance frequency of the detected image word in the stored plurality of pieces of music data based on the appearance frequency of the image word included in the detected music data, and corrects the appearance frequency of the image word included in the music data based on the calculated overall appearance frequency of the image word; and a selection device which selects the music data matching with the set search key from the stored music data based on the set search key and the calculated appearance frequency of the image word in the music data.

14. An information recording medium on which a music data selection program is computer-readably recorded, wherein the music data selection program causes a computer to function as:

a reading device which reads music data from one of a storage device which has a plurality of pieces of music data stored thereon and a storage medium which has a plurality of pieces of music data stored thereon;

a setting device which sets a search key as a standard of selection of the music data to be reproduced in the case of selecting the music data to be reproduced from the stored plurality of pieces of music data;

a detection device which detects at least an appearance frequency of an image word included in the music data and configures only a part of the music data by each piece of the stored music data by performing a morphological analysis of the music data based on lyrics data using a thesaurus analysis of the lyrics data to extract the image word and outputting an extracted image word list;

a determination information obtaining device which obtains determination information indicating whether or not the stored music data matches with the set search key;

an appearance frequency calculation device which calculates a correlation value between the set search key and the detected image word based on the obtained determination information and the detected image word of the music data, and calculates the appearance frequency of the image word included in the music data in the set search key based on the calculated correlation value; and a selection device which selects the music data matching with the set search key from the stored music data based on the set search key and the calculated appearance frequency of the image word in the music data.

* * * * *